United States Patent [19]

Vartanian

[11] 4,373,132

[45] Feb. 8, 1983

[54] EXTERNAL/INTERNAL HEATER FOR MOLDING OF PLASTICS

[76] Inventor: Haig Vartanian, 817 Ashbourne Rd., Cheltenham, Pa. 19012

[21] Appl. No.: 290,140

[22] Filed: Aug. 5, 1981

[51] Int. Cl.³ .......................... F27B 14/00; B29F 1/03
[52] U.S. Cl. ................................ 219/421; 29/157.3 R; 165/104.26; 219/523; 219/530; 222/146 HE; 264/328.15; 425/549; 425/566
[58] Field of Search ............... 219/421, 424, 426, 523; 165/32, 47, 104.26; 62/514 R; 29/157.3 R; 239/601, 135; 249/105; 222/146 HE; 264/328.8, 328.15; 425/143, 144, 547, 548, 549, 550, 572, 566, 406, 411, 407, 461, 378 R; 123/41.16

[56] References Cited

U.S. PATENT DOCUMENTS

| | | | |
|---|---|---|---|
| 3,010,155 | 11/1961 | Gilmore | 264/328.15 |
| 3,680,189 | 8/1972 | Noren | 29/157.3 R |
| 3,700,028 | 10/1972 | Noren | 165/32 |
| 3,707,265 | 12/1972 | Seres | 239/601 |
| 3,714,981 | 2/1973 | Noren | 165/47 |
| 4,034,952 | 7/1977 | Stewart | 249/105 |
| 4,058,159 | 11/1977 | Triarte | 29/157.3 R X |
| 4,125,352 | 11/1978 | Gellert | 425/549 X |
| 4,161,386 | 7/1979 | Osuna-Diaz | 425/549 |
| 4,196,855 | 4/1980 | Osuna-Diaz | 239/135 |

Primary Examiner—Volodymyr Y. Mayewsky
Attorney, Agent, or Firm—Caesar, Rivise, Bernstein & Cohen, Ltd.

[57] ABSTRACT

A nozzle for use in an injection molding machine. The nozzle comprises a tripartite body having an inlet, an outlet and an interconnected passageway extending therethrough. A heat pipe is located within the center of the body and portions of the passageway are disposed about the heat pipe. A resistance heating band is mounted on the body to conduct heat therethrough to heat the heat pipe. The heat pipe serves to heat plastic flowing through the surrounding passageway portions to the outlet.

6 Claims, 7 Drawing Figures

EXTERNAL/INTERNAL HEATER FOR MOLDING OF PLASTICS

This invention relates generally to nozzles used in connection with plastic injection molding machines, and more particularly to heated injection molding nozzles for plastics which are designed to maintain the plastic flowing therethrough at a relatively high temperature.

In order to obtain desirable results during the molding process, it is necessary that the molten plastic be injected into a mold at a rather high temperature. Failure to maintain the molten plastic at a sufficiently high temperature during this molding process results in the formation of "sprues" (the premature solidification of plastic material inside the nozzle), and/or the formation of "runners" (the premature solidification of the molten material within the mold cavity.)

Several injection molding nozzles disclosed in the prior art feature heating means designed for maintaining the molten plastic passing through the nozzle's passageway at an elevated temperature. Some of these devices feature an annular passageway through which molten plastic flows and an elongated resistance heating element located in the center of the passageway such that the molten plastic flowing through the passageway is heated to prevent it from cooling before injection into the mold cavity. Although these nozzles are generally effective in maintaining the molten plastic at a high temperature during the injection process, a significant drawback associated with these devices is that the electrical leads running to the centrally located heater element must pass through the body of the nozzle with the resulting disadvantage being that when these leads short out or burn out, as they frequently do, the nozzle must be removed from operation and/or disassembled in order to make the needed repairs. Examples of such devices are shown in U.S. Pat. Nos. 3,010,155 (Gilmore), 3,707,265 (Seres) and 4,164,389 (Osuna-Diaz).

A second technique disclosed in the prior art for maintaining the plastic at an elevated temperature involves surrounding the nozzle's passageway with some type of heating means, e.g., a heater resistance element, heat pipes, etc. By the term heat pipe, it is meant a device each of which comprises an elongated, semi-hollow, fluid impervious tube having conductive walls, a tubular wick member positioned in its interior in close engagement with the inner wall surface and a vaporizable fluid such that when the tube is subjected to uneven heat conditions the liquid in the wick at the top point is vaporized. This vapor then fills the body of the pipe and condenses on the inner walls of the body, thus releasing its latent heat of vaporization and causing the surface walls of the pipe to be maintained at a constant temperature. Consequently, a heat pipe has the remarkable attribute of being able to quickly and efficiently transmit heat from one portion of its surface to all other portions of its surface. Examples of heat pipes have been disclosed in the following U.S. Pat. Nos.: 3,680,189 (Noren) 3,700,028 (Noren) and 3,714,981 (Noren).

Although the prior art injection molding nozzles using heating means surrounding the passageway through which the plastic flows generally avoid the problems and disadvantages associated with nozzles which have heating means located internally, (e.g., centrally) in inaccesible locations, those nozzles using external or perimeter heating means present an additional problem not found in the nozzles having centrally located heating means. In this regard the former type of nozzle, while maintaining the molten plastic flowing through the nozzle at a high temperature, also causes the outer or external surface of the nozzle housing which is contiguous with the mold cavity to become quite hot. As is recognized by those skilled in the art it is desirable to maintain the mold cavity at a relatively low temperature so that the molten plastic will quickly harden once the plastic has filled the mold cavity. Moreover, maintaining the mold cavity at a relatively low temperature greatly expedites the molding process and thus increases productivity.

Examples of injection molding nozzles utilizing external or perimeter type of design are shown in U.S. Pat. Nos. 4,196,855 (Osuna-Diaz) and 4,034,952 (Stewart).

Accordingly, it is the general object of the instant invention to provide a heated injection molding nozzle which overcomes the disadvantages of the prior art.

It is a further object of the instant invention to provide an internally heated injection molding nozzle having heating means externally mounted, on the housing of said nozzle.

It is a further object of the instant invention to provide a heater nozzle which utilizes an externally mounted heater element which cooperates with an internally mounted heat probe to heat the molten plastic flowing therealong while maintaining a relatively cool temperature adjacent the mold cavity.

It is a further object of the instant invention to provide a heater nozzle which is simple in construction, in order that it may be manufactured inexpensively and serviced or repaired readily.

These and other objects of the instant invention are achieved by providing an internally heated injection molding nozzle for use in a conventional plastic molding machine.

The nozzle of the instant invention comprises an elongated housing member having an inlet, an outlet and interconnecting passage means for carrying a viscous material therebetween. The outlet is arranged in a manner suitable for injecting said material into a mold cavity. The nozzle further includes an elongated heat pipe means located in said housing such that the passageways are disposed about the periphery of said heat pipe. Also included are heating means mounted externally to the housing in good thermally transmissive contact with the heat pipe so that said heat pipe conducts heat to the surrounding passageway portions, thus heating the plastic material as it passes therethrough.

Other objects and many of the attendant advantages of the instant invention will be readily appreciated as the same becomes better understood by reference to the following detailed description when considered in connection with the accompanying drawing wherein.

Figure 1:
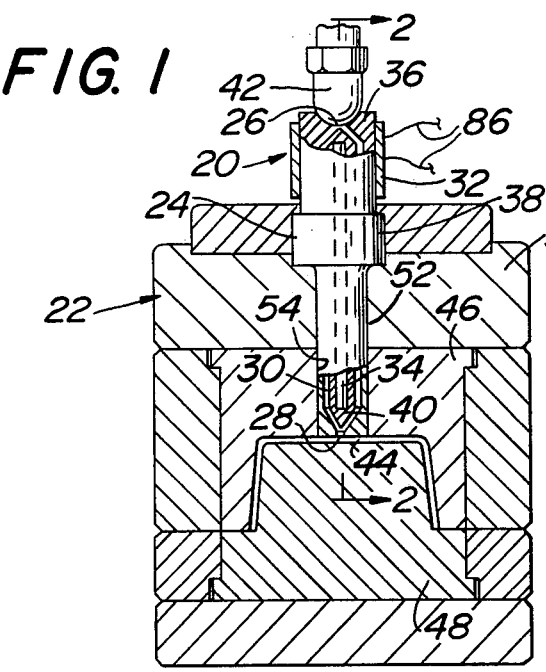
FIG. 1 is a vertical sectional view of one preferred embodiment of the nozzle of the instant invention mounted in a typical molding machine.

Referring now to the various figures of the drawing wherein like reference characters refer to like parts, there is shown at 20 in FIG. 1 an injection molding nozzle constructed in accordance with the instant invention. The nozzle 20 is arranged to be used in a conventional plastic molding machine 22 (only a portion of which is shown herein).

The device 20 of the instant invention basically comprises a body portion 24 having an inlet 26, an outlet 28, an internally connecting passageway 30, externally mounted heating means 32 and internally mounted heating means 34. The nozzle is arranged to receive molten plastic at its inlet, to pass the plastic through the passageway and out its outlet, while heating the plastic as it passes through the passageway so that it does not solidify. As will be described in considerable detail later the externally mounted heating means effects the heating of the internally mounted heating means 34. The internally mounted heating means is disposed within the housing so that it lies along the passageway to heat the plastic flowing therethrough. The externally mounted heating means is located on the housing at a convenient location for easy access, for reasons to be considered hereinafter.

Before going into any further description of the nozzle of the instant invention, a brief description of the molding machine 22 is in order. To that end the molding machine includes a machine nozzle 42 (only a portion of which is shown) which is coupled to a heating chamber (not shown). The plastic for the injection molding process is heated in the heating chamber and flows through the machine nozzle 42 for introduction into the nozzle 20 of the instant invention.

The nozzle 20 is arranged to inject the molten plastic into the mold cavity 44 of the machine 22. The mold cavity is formed from the joinder of an upper mold plate 46 and a lower mold plate 48 which are configured so that when they are located adjacent each other they define the space into which the plastic is injected for forming the molded article. The mold cavity is of conventional construction and includes an air exit (not shown). The mold plates are held within the molding machine's housing. That housing includes a top plate 50 having an opening through which a portion of the nozzle 20 extends. The upper mold plate 46 also includes an opening 54 which is aligned with the opening 52 and through which a portion of the nozzle 20 extends so that the tip of the nozzle at the outlet 28 is contiguous with the mold cavity 44.

The nozzle body 24 basically comprises a shank 36, a bushing 38 and a probe 40 which are connected together to form a rigid body, as will be described in detail later. The components making up the body are formed of a good thermally conductive (transmissive) material, such as a conductive metal, like aluminum.

The shank 36 of the nozzle is a generally rod-like element of circular cross-section having a free end 56 including a concave depression 58 therein. At the nadir of the depression is the inlet 26. The depression 58 is arranged to receive the domed tip of the molding machine nozzle 42. The opposite end of the shank 36 includes the helical threaded portion 60. A central bore 62 extends down the center of the shank from the end 60 to a point closely adjacent the outlet 28. The bore is of circular-cross section and is arranged to snuggly receive a portion of a heat pipe (to be described later) which makes up the internal heating means 34. The entrance to the central bore 62 at the end 60 is in the form of an enlarged mouth 64 including internal helical threads. The helical threads of the mouth are adapted to engage helical threads on the probe, to be described later, to secure the probe to the shank.

The probe is the elongated rod-like element having a conical tip 66 at one end. The other end of the probe is in the form of an annular walled projection 70 whose outer periphery is helically threaded. The outer diameter of the projection 70 is the same as the inside diameter of the bore mouth 64 so that the walled projection 70 can be threadedly engaged within the mouth of the shank 64 to secure the probe to the shank. An annular flange 71 extends about the periphery of the probe contiguous with the projection 70 to serve as a stop to engage the front face of the shank when the probe is secured in place. The probe also includes a central bore 72 extending down its center from the end 68 to a point immediately adjacent the conical tip 66. The bore 72 is aligned with the bore 62 and is also arranged to receive snuggly therein the remaining portion of the heat pipe 34, to be described later.

The bushing 38 is in an elongated sleeve-like member formed of a circular side wall portion 74 and a connecting portion 76. The connecting portion 76 is a form of an annular ring having an enlarged circular recess in its center. The recess includes a helical thread 77 extending about the periphery thereof and adapted to engage the helical thread 60 on the shank to secure the bushing to the shank. The opposite end of the bushing includes a central opening communicating with the outlet 28.

The internal diameter of the interior of the bushing, that is the space defined by the inner surface of the bushing's sidewall is larger in diameter than the outside diameter of the probe to define an annular passageway section 78 therebetween. The annular passageway section 78 forms a portion of the passageway 30 through which the plastic flows. The remaining portion of the passageway 30 is formed by a plurality of parallel connected, linear passageway sections formed in the shank 36. To that end shank 36 includes a plurality of longitudinally extending linear passages 80 disposed at equadistantly spaced locations about the periphery of the central bore 62. Each passage section 80 lies at the same radial distance from the center of the bore 62. That radial distance is equal to the radial distance from the center of the bore of the probe to the annular passageway section 78 so that each linear passageway section 80 is in fluid communication with the opening of the annular passageway section 78 at the interface of the shank and bushing.

Associated with each linear passageway section 80 is a respective angular extending passageway section 82. All of the sections 82 merge together at the nozzle's inlet 26. Accordingly, when molten plastic is injected from the machine nozzle 42 into the inlet 26 the plastic divides up and flows through the angularly extending passageway sections 82 and the associated linear passageway sections 82, whereupon the plastic enters the annular passageway section 78 flows down its length to the outlet 28.

The internal heater 34 as mentioned heretofore comprises a heat pipe. The heat pipe can be of any suitable conventional construction, such as those described heretofore. The heat pipe is disposed within the communicating bores 62 and 72 in the shank and probe, respectively, and is snuggly fit therein so that it makes good thermal engagement with the material forming such parts.

The external heater 32 is of conventional construction and includes a resistance heating element (not shown) which is connected, via a pair of electrical wires 86, to a source of electrical potential (not shown) to effect the heating of the element. The heater band is disposed about and mounted in good thermally transmissive engagement with the periphery of the shank 36 adjacent the input end.

Heat generated by the band 32 is transmitted through the highly conductive shank 36 to heat the upper portion of the heat pipe. By virtue of the construction of the heat pipe heat transmitted to the end adjacent the heater band is rapidly and efficiently conducted down the full length of the heat pipe. Accordingly the heater band effects the uniform heating of the heat pipe along its entire length.

Since the heat pipe is centrally located within the nozzle 20, with the passageway portions 78, 80 and 82 disposed thereabout, the heat pipe transmits the heat radially outward through the contiguous portions of the nozzle body to the surrounding passageways, thereby heating the plastic flowing through the passageway between the inlet and the outlet.

As will appreciated by those skilled in the art since the plastic-carrying passageway 30 surrounds the heat pipe, the passageway portions act to provide some thermal insulation between the heat pipe and portions of the mold cavity contiguous with the nozzle outlet 28, thereby preventing any undo heating of the mold cavity. Thus, by using the centrally mounted heat pipe the instant invention avoids the disadvantages associated with using an internal mounted heater element, while at the same time also avoiding the problems which are generally associated with externally mounted or perimeter mounted heating means.

In other words, with the instant invention the electrical leads 86 and the resistance heating band 32 are readily accessible without having to disassemble the nozzle such as is necessary with prior art internally heated injection nozzles. In addition, the fact that the heat pipe is somewhat insulated from the mold cavity by the interposed portions of the nozzle body as well as the annular passageway carrying the plastic, the mold cavity contiguous with the outlet of the nozzle is not unduly heated by the heat pipe, thereby enabling rapid successive molding operations to be effected.

It must be pointed out at this juncture that the nozzle 20 need not be constructed of the shank, bushing and probe as shown in FIGS. 1-5. All that is required is that the heat pipe be located within the nozzle body in a central position and with portions of the plastic carrying passageway being located spaced thereabout and with the heater band being disposed about a portion of the body in an external position and relatively close proximity to a portion of the heat pipe.

Figure 6:
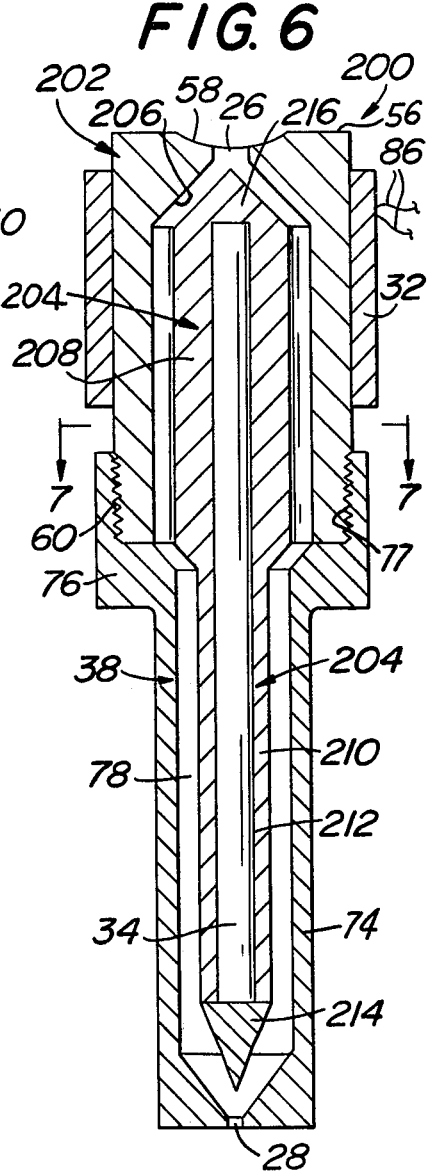
FIG. 6 is a sectional view, similar to that of FIG. 2, but showing an alternative preferred embodiment of the nozzle of the instant invention.
Figure 4:
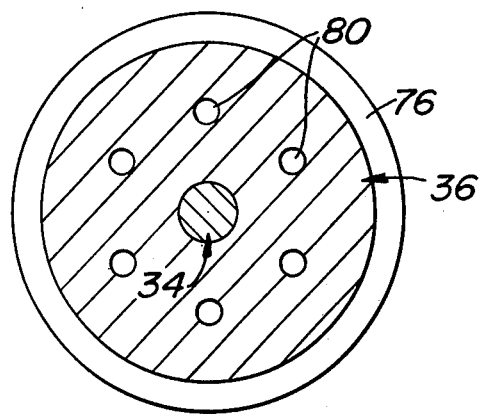
FIG. 4 is an enlarged sectional view taken along line 4—4 of FIG. 2.
Figure 5:
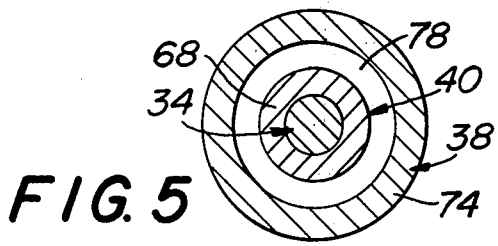
FIG. 5 is a sectional view taken along line 5—5 of FIG. 2.
Figure 7:
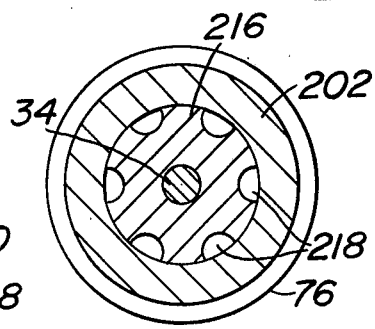
FIG. 7 is a sectional view taken along lines 7—7 of FIG. 6.
Figures 2, 3:
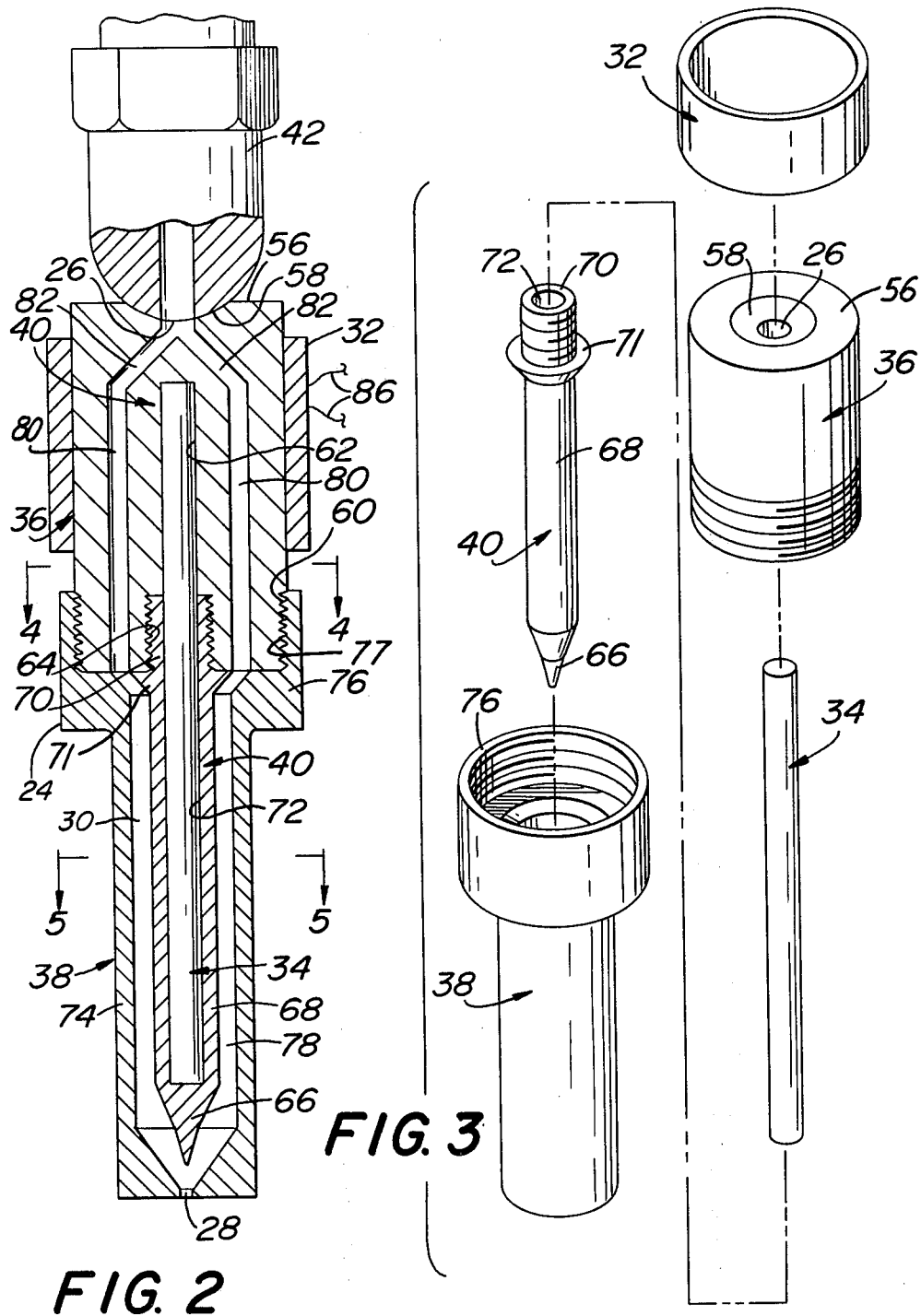
FIG. 2 is an enlarged sectional view taken along line 2—2 of FIG. 1.
FIG. 3 is an exploded perspective view showing the parts comprising the instant invention.

As example of an alternative construction to that shown in FIGS. 1-5 the probe and the portion of the shank surrounding the heat pipe may be formed as an integral unit. Such an alternative embodiment of nozzle is shown in FIG. 6 and is identified generally by the reference numeral 200. Those portions of nozzle 200 which are identical to corresponding portions of nozzle 20 are designated by the same reference numerals in FIG. 6 and will not be described in detail again.

The nozzle 200 basically comprises a shank sleeve 202, a bushing 38, a combined probe-shank element 204, a resistance heater band 32 and a heat pipe 34. The shank sleeve 202 is a tubular member of having a threaded end portion 60 arranged to be received in threaded engagement with the flanged portion 76 of the bushing (like the embodiment shown in FIGS. 1-5). The opposite end of the shank sleeve 202 includes a top wall having a concave depression 58. The nozzle inlet 26 is at the nadir of the depression 26. The interior of shank sleeve 202 is in the form of an enlarged central bore having a conical end 206 communicating with inlet 26.

The combined probe-shank 204 comprises an elongated rod-like member having an upper shank portion 208 and lower probe portion 210. The shank portion 208 is of larger external diameter than the probe portion 210. A longitudinal extending bore 212 extends down the center of the member 204. The heat pipe 34 is snuggly fit in the bore 212. A conical cap 214 is welded onto the tip of probe portion 210 to seal the heat pipe within the probe-shank 204. The opposite end of probe-shank 204 includes a conical end 216 which located closely adjacent the conical portion of shank sleeve's interior.

The shank portion 208 of the probe shank 204 is of circular periphery and includes a plurality of longitudinally extending linear recesses 218 equadistantly spaced about its periphery. Each recess runs the full length of the portion 208 to the conical end 216. The recesses merge together at the apex of the conical end 216. The outside diameter of the shank portion 208 is equal to the inside diameter of the interior of the shank sleeve 202 so that the interior wall of shank sleeve 202 contiguous with the recesses 218 and shank portion 208 form a plurality of longitudinally extending enclosed passages running the full length of the shank from the inlet 26 to the interface of the shank and the bushing.

The probe portion 210 of the probe shank 204 is located centrally within the hollow interior of the bushing. The outside diameter of portion 210 is less than the inside diameter of the bushing 38 to form an annular passageway 78 therebetween. The passageway 78 communicates with the passages 218 formed by the interface of the shank sleeve 202 and the shank portion 208. Accordingly, a complete passageway 30 between the input or inlet 26 and the outlet 28 is formed.

Like in the embodiment of FIGS. 1-5, the heating band 32 in nozzle 200 is mounted about the shank portion 202 adjacent the inlet 26. The heating band heats the heat pipe 34 in the same manner as described heretofore so that the operation of the nozzle 200 is identical to that of nozzle 20.

As will be appreciated from the foregoing the nozzle of the instant invention is simple in construction, can be readily fabricated, can be easily assembled and disassembled, provides ready access to the resistance heating band and yet does not unneccessarily heat the mold cavity.

Without further elaboration the foregoing will so fully illustrate my invention that others may, by applying current or further knowledge, readily adapt the same for use under various conditions of service.

What is claimed as the invention is:

1. A readily assemblable and disassemblable injection molding nozzle for carrying a viscous material to a mold and comprising a body, resistance heating means and elongated heat pipe means, said body having a longitudinal central axis and comprising a cylindrical shank member, a cylindrical bushing member and a cylindrical probe member, said shank member having an upper end including a central inlet located on said axis, said bushing member having a lower end including a central outlet located on said axis, said shank member being formed of a good thermally conductive material and having an outer sidewall surface, first passageway means in fluid communication with said inlet and disposed uniformly radially about said axis and second passageway means extending generally parallel to said axis and disposed at equadistantly spaced locations thereabout, said bushing member having a hollow interior portion and being releasably secured to said shank member, said probe member being connected to said shank member and having an elongated end portion disposed within the hollow interior of said bushing member to define an annular passageway therebetween, said annular passageway extending about said axis and being in fluid communication with said second passageway means and said outlet, said elongated heat pipe means being disposed along said axis and extending through said shank member and said probe member from a first point immediately adjacent said inlet to a second point immediately adjacent said outlet, with said first and second passageway means and said annular passageway means disposed uniformly about said heat pipe along its entire length, said resistance heating means comprising a band disposed about and secured to the outer sidewall surface of said shank member so that heat is conducted from said resistance heating means through said shank member to said heat pipe and therealong, whereupon when a viscous material is introduced into said inlet it flows for uniform distribution about said elongated heat pipe for heating thereby until said material exits said nozzle through said outlet.

2. The nozzle of claim 1 wherein respective surfaces of said shank member and said probe member conjoin to form said second passageway means.

3. The nozzle of claim 2 wherein said probe member includes a plurality of longitudinal recesses and said shank member has a central opening whose inner surface conjoins with said recesses to form said second passageway means.

4. The nozzle of claim 1 wherein said probe member is threadedly secured to said shank member.

5. The nozzle of claim 4 wherein said shank member includes a threaded hole and said probe member includes a threaded projection with said projection being threadedly secured to said hole.

6. The nozzle of claim 5 wherein said second passageway means is located in said shank member.

* * * * *